(12) United States Patent
Matsui

(10) Patent No.: US 9,197,762 B2
(45) Date of Patent: Nov. 24, 2015

(54) IMAGE READING DEVICE, FORMING APPARATUS, AND PROCESSING METHOD DETECTING AND REMOVING PERFORATIONS TO CORRECTLY IDENTIFY BLANK DOCUMENTS

(71) Applicant: KYOCERA Document Solutions Inc., Osaka (JP)

(72) Inventor: Shinya Matsui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/314,133

(22) Filed: Jun. 25, 2014

(65) Prior Publication Data

US 2015/0002911 A1 Jan. 1, 2015

(30) Foreign Application Priority Data

Jun. 28, 2013 (JP) .................................. 2013-136026

(51) Int. Cl.
| | |
|---|---|
| *H04N 1/12* | (2006.01) |
| *H04N 1/193* | (2006.01) |
| *H04N 1/38* | (2006.01) |
| *G06T 7/00* | (2006.01) |
| *H04N 1/00* | (2006.01) |
| *G06F 3/12* | (2006.01) |

(52) U.S. Cl.
CPC .......... *H04N 1/00034* (2013.01); *G06F 3/1211* (2013.01); *G06F 3/1218* (2013.01); *G06F 3/1229* (2013.01); *G06T 7/0002* (2013.01); *H04N 1/00005* (2013.01); *H04N 1/0005* (2013.01); *H04N 1/00013* (2013.01); *H04N 1/00063* (2013.01); *H04N 1/00803* (2013.01); *H04N 1/00954* (2013.01); *H04N 1/12* (2013.01); *H04N 1/193* (2013.01); *H04N 1/38* (2013.01); *H04N 2201/0081* (2013.01)

(58) Field of Classification Search
None
See application file for complete search history.

(56) References Cited

U.S. PATENT DOCUMENTS 5,017,963 A * 5/1991 Tuhro ........................... 399/190
5,383,754 A * 1/1995 Sumida et al. ................. 412/11
5,448,376 A * 9/1995 Ohta ............................. 358/448

(Continued)

FOREIGN PATENT DOCUMENTS

| JP | 2003-198777 A | 7/2003 |
| JP | 2010-028647 A | 2/2010 |

(Continued)

OTHER PUBLICATIONS

An Office Action; "Notice of Reasons for Rejection," issued by the Japanese Patent Office on Sep. 8, 2015, which corresponds to Japanese Patent Application No. 2013-136026 and is related to U.S. Appl. No. 14/314,133.

*Primary Examiner* — Scott A Rogers
(74) *Attorney, Agent, or Firm* — Studebaker & Brackett PC

(57) ABSTRACT

An image reading device includes an image reading section, a first white reference member, and a control section. The image reading section reads an original document. The first white reference member is be read by the image reading section and indicates a first white reference. The control section determines whether or not a perforation image is present in the original document image indicative of the original document on a basis of an image density of a first reference image indicative of the first white reference member and an image density of the original document image.

11 Claims, 10 Drawing Sheets

(56) References Cited

U.S. PATENT DOCUMENTS

| | | | |
|---|---|---|---|
| 5,850,478 A * | 12/1998 | Suzuki et al. | 382/204 |
| 6,944,355 B2 * | 9/2005 | Lupien et al. | 382/275 |
| 8,405,887 B2 * | 3/2013 | Oumi | 358/475 |
| 8,494,304 B2 * | 7/2013 | Venable et al. | 382/275 |
| 8,824,822 B2 * | 9/2014 | Lei et al. | 382/254 |
| 2005/0200903 A1 * | 9/2005 | Okubo | 358/3.24 |
| 2009/0103114 A1 * | 4/2009 | Nishimura | 358/1.5 |
| 2014/0036320 A1 * | 2/2014 | Tanaka | 358/465 |

FOREIGN PATENT DOCUMENTS

| | | |
|---|---|---|
| JP | 2012-080232 A | 4/2012 |
| JP | 2012-191315 A | 10/2012 |

\* cited by examiner

IMAGE READING DEVICE, FORMING APPARATUS, AND PROCESSING METHOD DETECTING AND REMOVING PERFORATIONS TO CORRECTLY IDENTIFY BLANK DOCUMENTS

INCORPORATION BY REFERENCE

The present application claims priority under 35 U.S.C. §119 to Japanese Patent Application No. 2013-136026, filed Jun. 28, 2013. The contents of this application are incorporated herein by reference in their entirety.

BACKGROUND

The present disclosure relates to image reading devices, image forming apparatuses including an image reading device, and image processing methods.

Image forming apparatuses include an auto-document feeder to automatically convey original documents. Automatic conveyance of original documents can result in efficient reading of images of the original documents and copying of the images to sheets.

Where there is a blank document among the read original documents, in order to prevent the blank document from being copied to a sheet as it is, image forming apparatuses of some type determine whether or not a blank document is included in the original documents and performs image processing to eliminate an image of an original document determined as a blank document from to-be-copied original documents.

However, where a perforation is formed in the blank original document, a shadow is casted around the perforation in image reading, thereby disabling accurate blank document determination. In view of this, image processing devices of some type eliminate a predetermined region where a perforation is usually present from a determination region in advance to prevent mis-determination of a blank document.

SUMMARY

An image reading device according to the present disclosure includes an image reading section, a first white reference member, and a control section. The image reading section is configured to read an original document. The first white reference member is configured to be read by the image reading section and to indicate a first white reference. The control section is configured to determine whether or not a perforation image is present in the original document image indicative of the original document on a basis of an image density of a first reference image indicative of the first white reference member and an image density of the original document image.

An image forming apparatus according to the present embodiment includes the above image reading device and an image forming section configured to form a toner image on a paper.

A method for processing an image according to the present disclosure includes: reading a white reference member; reading an original document; and determining whether or not a perforation image is present in an image of the original document read in the reading an original document on the basis of an image density of a reference image indicative of the white reference member and an image density of the original document image indicative of the original document.

DETAILED DESCRIPTION

With reference to FIGS. 1-10, description will be made about embodiments of an image reading device, an image forming apparatus, and an image processing method according to the present disclosure. The present disclosure is not intended to be limited to any configurations described in the following embodiments and accompanying drawings, and encompasses any configurations equivalent to the following configurations.

[Configuration of Image Forming Apparatus 100]

Figure 1:
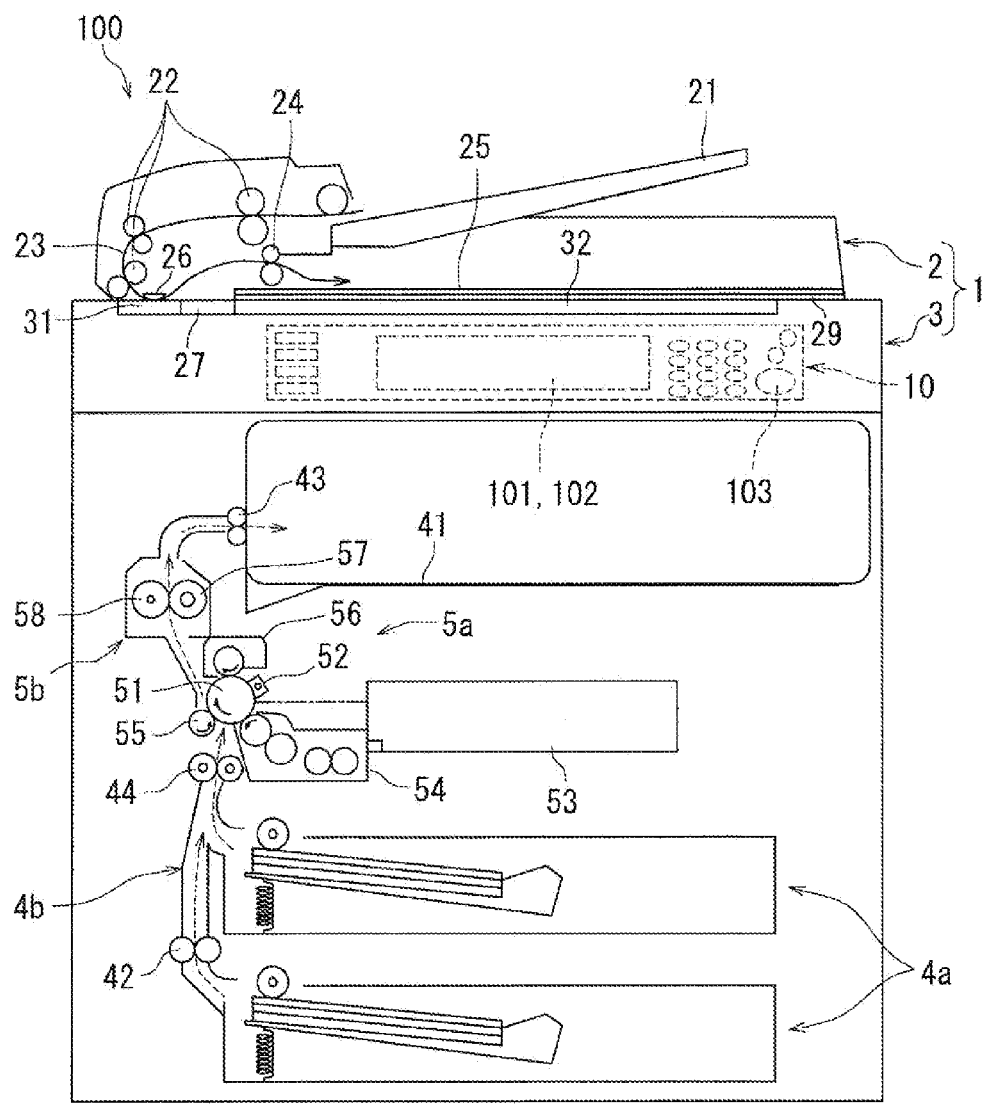
FIG. 1 is a schematic front cross sectional view of an image forming apparatus including an image reading device according to one embodiment of the present disclosure.
Figure 2:
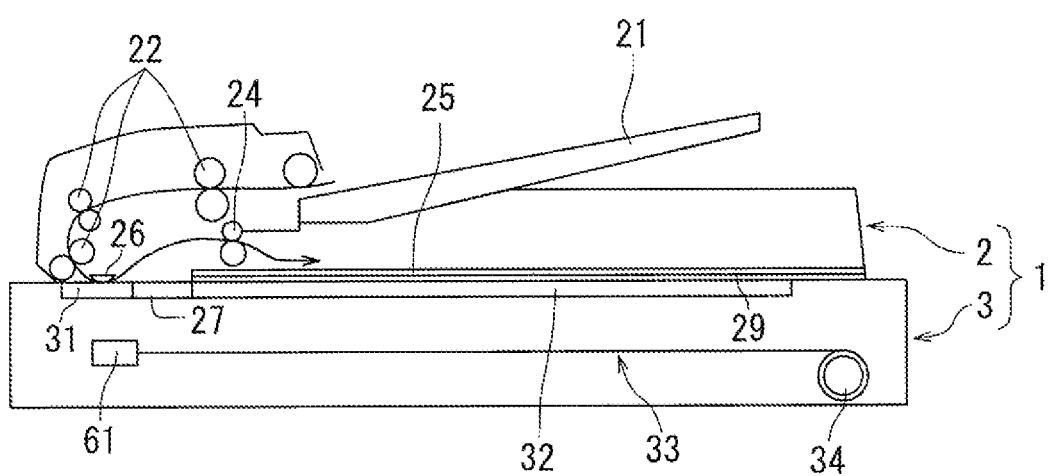
FIG. 2 is a schematic front cross sectional view of a part of the image forming apparatus according to one embodiment of the present disclosure.
Figure 3:
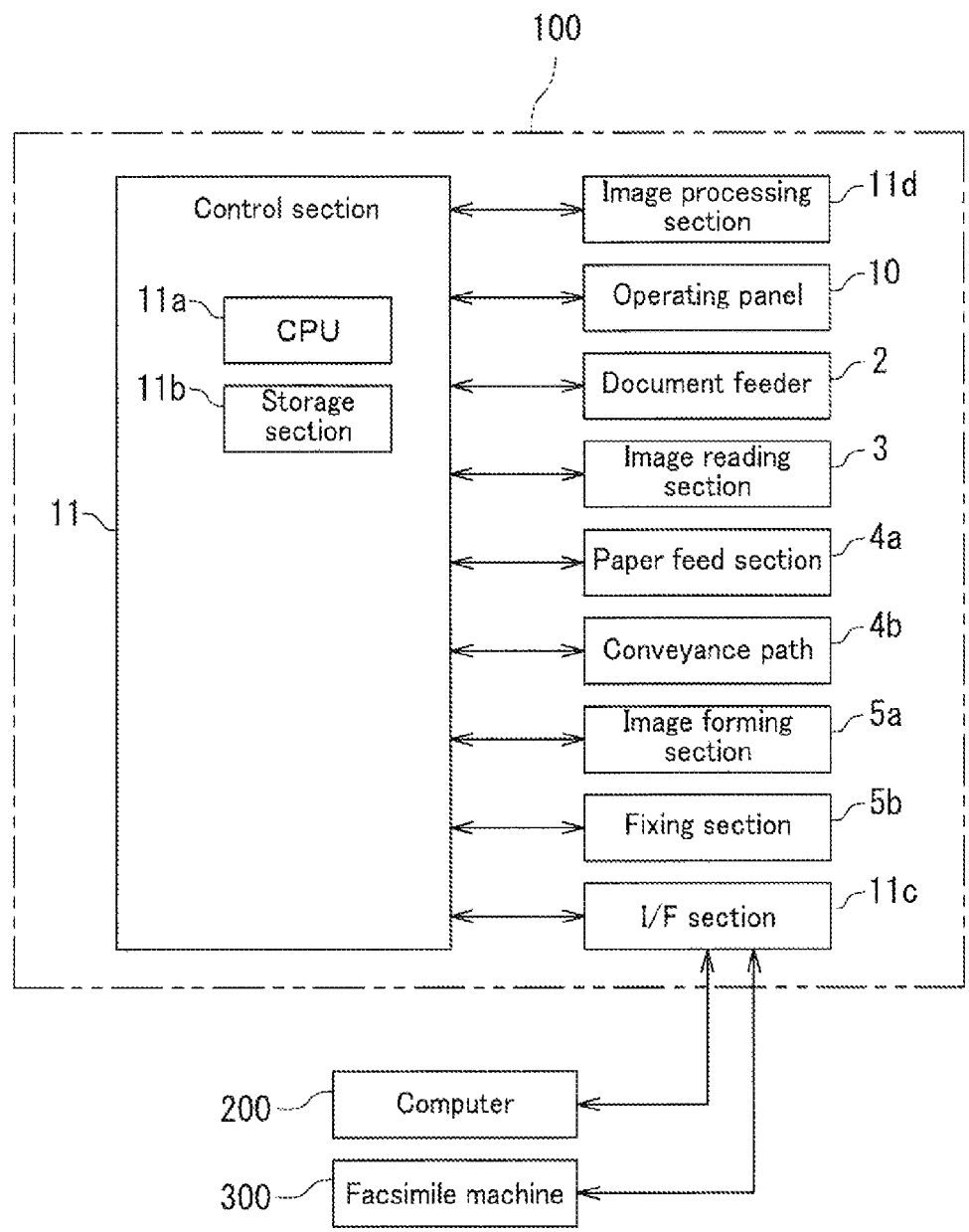
FIG. 3 is a block diagram showing a hardware configuration of the image forming apparatus.

FIG. 1 is a schematic front cross sectional view of an image forming apparatus 100 including an image reading device 1 according to one embodiment of the present disclosure. FIG. 2 is a schematic front cross sectional view of a part of the image forming apparatus 100 according to the embodiment of the present disclosure. FIG. 3 is a block diagram showing a hardware configuration of the image forming apparatus 100. The image forming apparatus 100 will be described below with reference to FIGS. 1-3.

The image forming apparatus 100 includes a document feeder 2, an image reading section 3, a white reference member 27, a paper feed section 4a, a conveyance path 4b, an image forming section 5a, a fixing section 5b, and a control section 11.

The document feeder 2 includes an document feed tray 21 on which original documents as to-be-read objects are to be loaded, original document conveyance roller pairs 22, an original document conveyance path 23, an original document ejection roller pair 24, an original document exit tray 25, a guide member 26, and an original cover 29. Original documents loaded on the document feed tray 21 are sent out to the original document conveyance path 23 on a sheet-by-sheet basis. The sent original documents are each guided by the guide member 26 located above a sending/reading contact glass 31 provided on the top of the image reading section 3, and are conveyed consecutively so as to come in contact with the sending/reading contact glass 31. Then, the original document ejection roller pair 24 ejects the read original documents onto the original document exit tray 25. The guide member 26 is white in color.

The document feeder 2 is capable of being turned upward about its rear side corresponding to the rear of the paper of FIG. 1 as a pivot axis. An original document such as a book can be loaded on a loading/reading contact glass 32 provided on the top of the image reading section 3. The original cover 29 presses an original document loaded on the loading/reading contact glass 32. The original cover 29 is white in color. The image reading section 3 irradiates light to an original document passing over the sending/reading contact glass 31 or to an original document loaded on the loading/reading contact glass 32, reads an image of the original document on the basis of the reflected light from the original document, and generates image data indicative of the image of the original document. The image reading section 3 includes a reading unit 61 (hereinafter also referred to as a first reading unit 61).

The reading unit 61 is of contact image sensor (CIS) type and is connected to a take-up drum 34 through a wire 33. The take-up drum 34 is rotated by a take-up motor that rotates in forward or reverse direction, thereby being capable of freely moving the reading unit 61 in the horizontal direction, that is, the right and left directions of the image forming apparatus 100. In order to read an original document with the use of the document feeder 2, the reading unit 61 is secured below the sending/reading contact glass 31. When an original document passes over the sending/reading contact glass 31 via the original document conveyance path 23, the light is irradiated to the original document so that its reflected light by one line in the main scanning direction (direction orthogonal to the paper of FIG. 1) is reflected by an image sensor (not shown) of the reading unit 61 for imaging. Then, the original document is continuously conveyed so that the next line of the original document in the main scanning direction is read. By contrast, in order to read an original document loaded on the loading/reading contact glass 32, the reading unit 61 is moved in the horizontal direction by rotation of the take-up drum 34.

Between the sending/reading contact glass 31 and the loading/reading contact glass 32, the white reference member 27 (hereinafter also referred to as a first white reference member 27) is provided to indicate a white reference. In the present embodiment, the white reference member 27 is a plate extending in the main scanning direction (direction perpendicular to an original document conveyance direction) of the image reading device 1. The white reference member 27 has a reflectivity equivalent to each reflectivity of the guide member 26 and the original cover 29. An operating panel 10 is provided in the front of the image reading section 3.

The operating panel 10 is provided at the front upper part of the image forming apparatus 100. The operating panel 10 includes a liquid crystal display section 101 to display the state of the image forming apparatus 100 and various types of messages. The liquid crystal display section 101 displays a plurality of keys for function selection, function setting, character input, etc. A touch panel section 102 is provided on the top of the liquid crystal display section 101. The touch panel section 102 extracts a point where the user pushes in the liquid crystal display section 101. Various types of hard keys including a start key 103 to instruct an execution start of a function such as copying are provided on the operating panel 10.

The paper feed section 4a accommodates a plurality of sheets (e.g., copy paper, plain paper, recycled paper, thick paper, OHP sheets, etc.) and sends them to the conveyance path 4b on a sheet-by-sheet basis. The conveyance path 4b is a path through which a sheet is conveyed from the paper feed section 4a to the exit tray 41. The conveyance path 4b is provided with conveyance roller pairs 42 and 43 that rotate in paper conveyance, and a registration roller pair 44. The registration roller pair 44 keeps a conveyed sheet waiting before the image forming section 5a and sends it with timing of toner image formation.

The image forming section 5a forms a toner image on the basis of image data and transfers the toner image to a conveyed sheet. The image forming section 5a includes a photosensitive drum 51, a charger 52, an exposure device 53, a developing device 54, a transfer roller 55, and a cleaner 56. The photosensitive drum 51 is supported rotatably. The charger 52 is arranged around the photosensitive drum 51.

The photosensitive drum 51 is provided at the central part of the image forming section 5a and rotates in a predetermined direction. The charger 52 electrostatically charges the photosensitive drum 51 to a predetermined potential. The exposure device 53 outputs laser light on the basis of image data to scan and expose the surface of the photosensitive drum 51, thereby forming an electrostatic latent image according to the image data. The image data may be image data obtained in the image reading section 3, image data transmitted from an external computer connected through a network, or the like, for example.

The developing device 54 supplies toner to an electrostatic latent image formed on the photosensitive drum 51 to develop the image. The transfer roller 55 is in press contact with the photosensitive drum 51 to form a first nip part. When a sheet enters the first nip part, predetermined voltage is applied to the transfer roller 55, thereby transferring a toner image on the photosensitive drum 51 to the sheet. The cleaner 56 removes toner remaining on the photosensitive drum 51 after transfer.

The fixing section 5b fixes a toner image transferred to a sheet. The fixing section 5b principally includes a heating roller 57 including a heating element, and a pressure roller 58. The heating roller 57 is in press contact with the pressure roller 58 to form a second nip part. When a sheet passes through the second nip part, the toner on the surface of the sheet is melt and heated, thereby fixing the toner image to the sheet. The sheet after the toner image is fixed is received by the exit tray 41.

The control section 11 controls each section of the image forming apparatus 100 (see FIG. 3). In one example, the control section 11 includes a CPU 11a and a storage section 11b.

The CPU 11a controls each section of the image forming apparatus 100 by loading and executing a control program stored in the storage section 11b. The storage section 11b is a storage device including a ROM, a RAM, an HDD, a flash ROM, etc. The storage section 11b stores a control program, a control data, and setting data for the image forming apparatus 100, image data obtained by scanning in the image reading section 3, etc.

The control section 11 is connected to the document feeder 2, the image reading section 3, the paper feeder 4a, the conveyance path 4b, the image forming section 5a, the fixing section 5b, the operating panel 10, etc. The control section 11 controls operations of the respective sections, thereby appropriately performing image formation according to the control program and data stored in the storage section 11b.

The control section 11 is connected to an I/F 11c. The I/F 11c includes a connector, a socket, a chip for communication control, etc. The I/F 11c connects the image forming apparatus 100 with a computer 200 (e.g., personal computer or server) and a facsimile machine 300 in a communicable manner through a network, a cable, a public line, or the like. In one example, image data including setting data and the like can be transmitted through the I/F 11*c* to the computer 200 and the facsimile machine 300 bi-directionally (scan function and facsimile function). Further, image data from the computer 200 and the facsimile machine 300 can be accumulated in the storage section 11*b* and be printed through the I/F 11*c*.

The image reading device 1 according to the present embodiment includes the document feeder 2, the image reading section 3, and the control section 11. In order for the image forming apparatus 100 to perform the copy function or the scan function, the image reading device 1 reads an original document to generate original document image data indicative of an image of the original document. In order to perform the copy function, the image forming section 5*a* forms a toner image on a sheet according to original document image data, and the fixing section 5*b* fixes the toner image. Thus, an image is formed on the sheet. In order to perform the scan function, original document image data is transmitted to the computer 200 or the facsimile machine 300.

[Image Processing that Image Reading Device 1 Performs]

Figure 4:
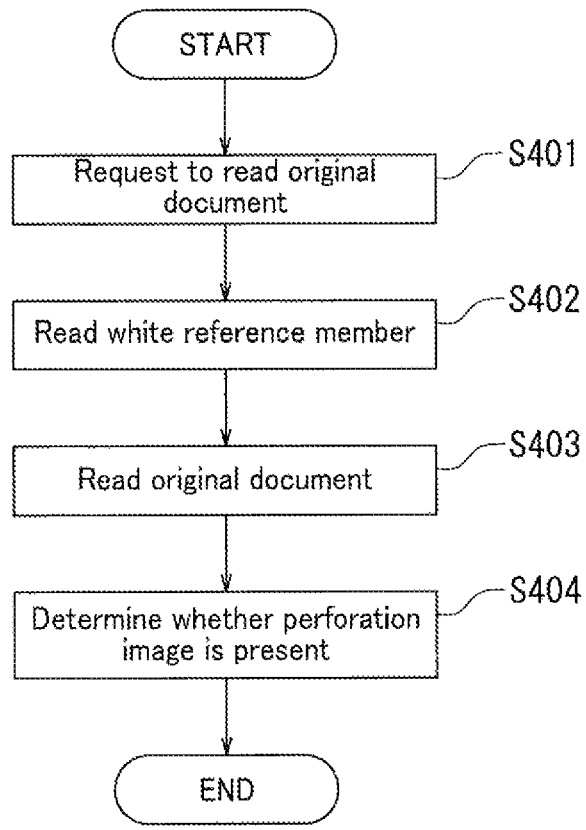
FIG. 4 is a flowchart depicting an image processing method that the image reading device performs in copying or scanning.

FIG. 4 is a flowchart depicting an image processing method that the image reading device 1 performs. In the image processing method according to the present embodiment, the image reading device 1 performs detection of a perforation image on an image of a read original document. The image processing method includes Steps S401-S405. The image processing method according to the present embodiment will be described below with reference to FIGS. 1, 2, and 4.

Step S401: The user pushes the start key 103 in the operating panel 10 to cause reading of an original document.

Step S402: In response to a request to read the original document, the reading unit 61 reads the white reference member 27 to generate reference image data. The reference image data indicates an image of the white reference member 27 (hereinafter referred to as a reference image). Data of the reference image is stored in the storage section 11*b*.

Step S403: After Step S402, the reading unit 61 reads the original document. Specifically, the reading unit 61 reads the original document conveyed by the document feeder 2 to generate original document image data indicative of an original document image.

Step S404: After the step S403, the control section 11 determines whether or not a perforation image is present in the original document image on the basis of the image density of the reference image indicated in the reference image data and the image density of the original document image indicated in the original document image data.

Figure 5A:
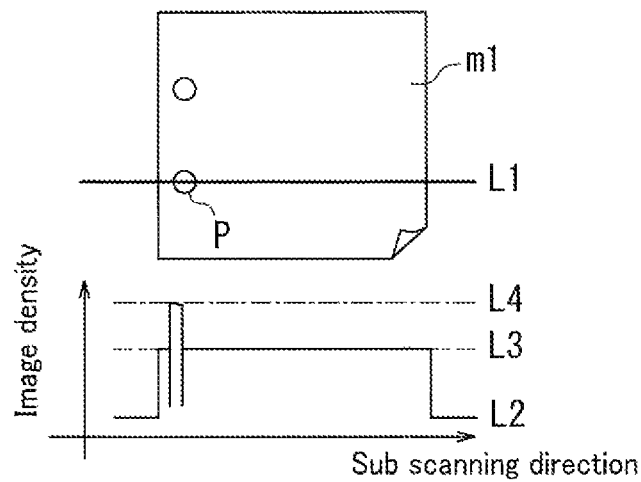
FIGS. 5A-5C are graph representations showing distributions of image density of original document images generated by reading various types of original documents.
Figure 5B:
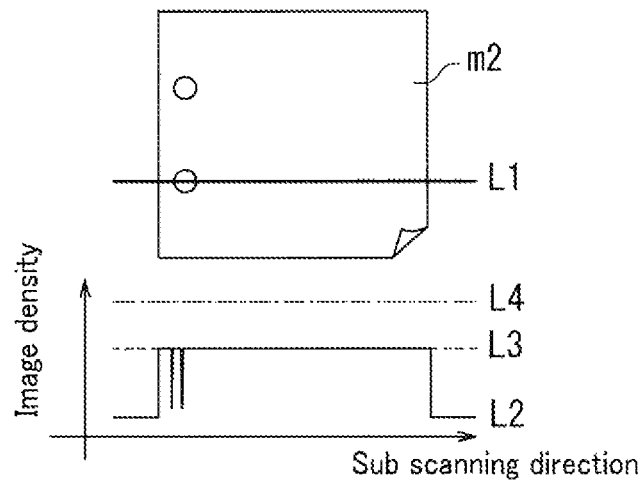
Figure 5C:
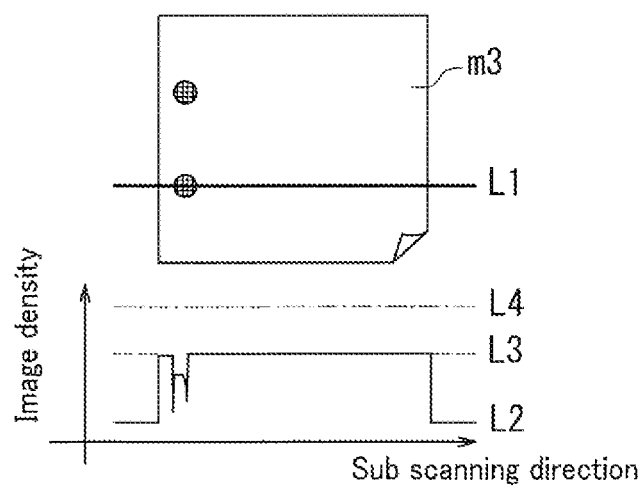

FIGS. 5A-5C are graph representations showing distributions of the image density of original document images. In FIGS. 5A-5C, the horizontal axes and the vertical axes indicate pixel position in respective original documents in the sub scanning direction and image density, respectively. The lower the value of the image density on the vertical axis is, the darker the image is. The higher the value thereof is, the brighter the image is. Where the reading unit 61 can distinguish 256 levels of gray (8 bits), for example, a grayscale value of 0 represents black, while a grayscale value of 255 represents white. With reference to FIG. 5, description will be made below about a scheme to determine whether or not a perforation image is present in an original document image.

FIG. 5A is a graph representation showing a distribution of the image density of an original document image generated by reading an original document m1. The original document m1 is perforated. In the graph representation of FIG. 5A, a thick line L1 is a line passing across one of perforations P of the original document m1 in the sub scanning direction. A thin solid line L2 indicates a distribution of the image density of the image of the original document m1 along the thick solid line L1. A broken line L3 indicates the image density of a blank region in the original document image where no image is present. A dashed line L4 indicates a distribution of the image density of the reference image obtained at Step S402.

In general, a member of which color has a grayscale value closer to the white grayscale value than the grayscale value of the blank region of the original document is used as the white reference member 27. For this reason, as shown by the broken line L3 and the dashed line L4 in FIG. 5A, the image density of the reference image is higher than that of the blank region in the original document image.

When the reading unit 61 reads the original document m1, the light reflected by the contour of each perforation P is less intense than the light reflected by the blank region of the original document, so that a shadow lies on the contour of the perforation P. For this reason, a circular frame formed by reading the shadow of the contour appears in the original document image. As indicated by the solid line L2 in FIG. 5, in the original document, the image density of the region where the circular frame appears is lower than that of the blank region. In other words, the image of the circular frame is darker than that of the blank region.

By contrast, the light from the reading unit 61 passes through the perforation P and irradiates the guide member 26 or the original cover 29 in the perforated region (region surrounded by the contour of the perforation P). Since the reading unit 61 reads the light reflected by the guide member 26 or the original cover 29, the image density of the perforated region in the original document image is equal to that of a region in the reference image where the perforation region of the original document corresponds (region where the coordinate geometry is the same).

FIG. 5B is a graph representation showing a distribution of the image density of an original document image generated by reading an original document m2. The original document m2 is an original document obtained by copying perforated paper. Circular frames are copied in the original document m2. In the graph representation of FIG. 5B, a thick solid line L1 is a line passing across one of the circular frames of the original document m2 in the sub scanning direction. FIG. 5C is a graph representation showing a distribution of the image density of an original document image generated by reading an original document m3. Patterns resemble to perforations are copied in the original document m3. In the graph representation of FIG. 5C, a thick solid line L1 is a line passing across one of the patterns resembled to perforations in the sub scanning direction of the original document m3. Thin solid lines L2 in FIGS. 5B and 5C indicate distributions of the image density of the images of the original documents m2 and m3 along the thick lines L1, respectively. Respective broken lines L3 indicate the image density of blank regions in the images of the original documents m2 and m3 where no image is present. Respective dashed lines L4 indicate the image densities of the reference images obtained at Step S402.

As shown in FIGS. 5B and 5C, the original documents m2 and m3 are not perforated. For this reason, no region having an image density equal to that of the reference image is present in the respective original document images generated by reading the original documents m2 and m3.

As can be understood from the explanation with reference to FIGS. 5A-5C, a region having an image density equal to that of the reference image is present in the original document image of a perforated original document. By contrast, no region having an image density equal to that of the reference image is present in the original document image of a nonperforated original document. In view of this, at Step S404, the control section 11 compares the pixels in the original document image with the corresponding pixels in the reference image to detect, in the original document image, any pixel having an image density equal to that of the reference image. The control section 11 determines whether or not a perforation image is present in the original document image according to a result of detection of the pixel having the equal image density.

Figure 6:
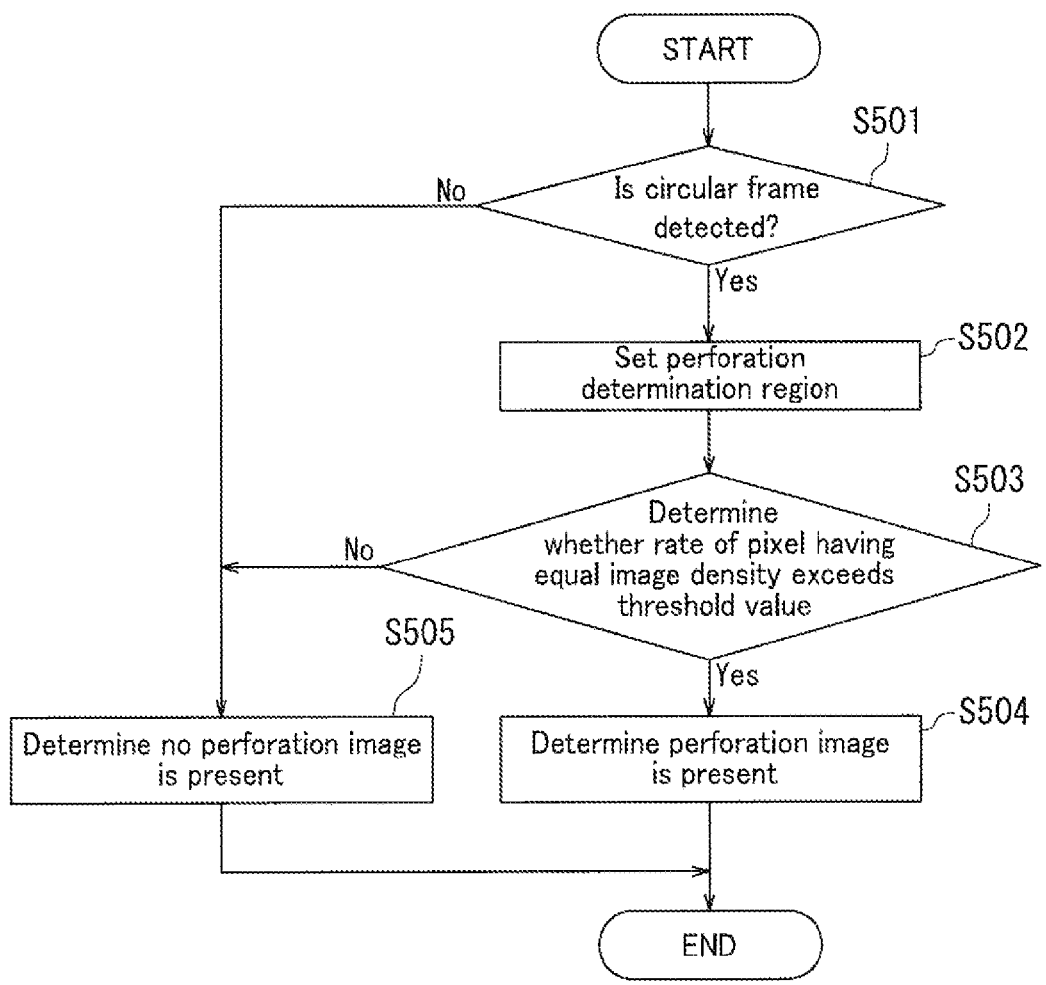
FIG. 6 is a flowchart depicting Step S404 in the image processing method according to the present embodiment.
Figure 7:
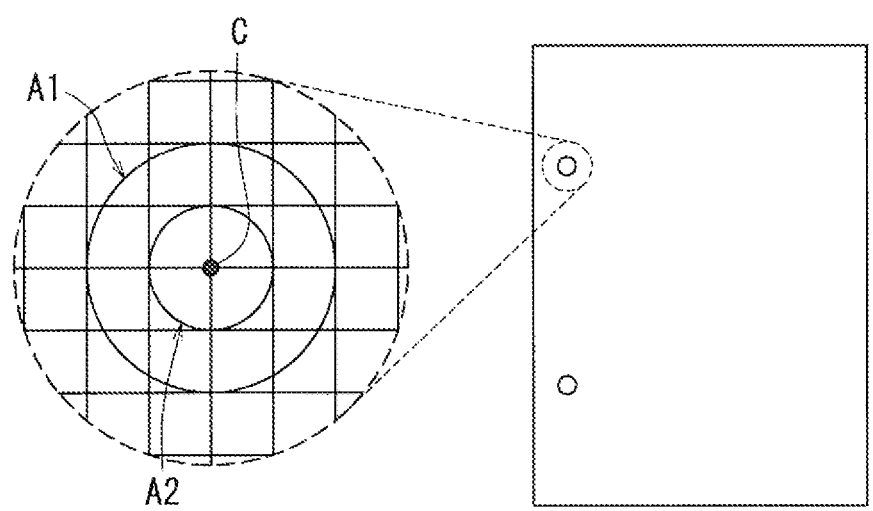
FIG. 7 is an illustration showing a perforation candidate region and a perforation determination region in an original document image.

FIG. 6 is a flowchart depicting Step S404 in the image processing method according to the present embodiment. Step S404 is performed through Steps S501-S505. FIG. 7 is an illustration showing a perforation candidate region and a perforation determination region in an original document image. Step S404 will be described below with reference to FIGS. 6 and 7.

Step S501: The control section 11 analyses an original document image to detect a circular frame from the original document image. As shown in FIG. 7, circular frames of perforations appear in the left end part of an original document image in many cases. The control section 11 detects each circular frame in the left end part of the original document image shown in FIG. 7. The circular frame can be detected by pattern matching, for example. When no circular frame is detected, the routine for the image processing proceeds to Step S505. By contrast, when a circular frame is detected, the control section 11 extracts a region including the circular frame as a perforation candidate region A1. Then, the routine proceeds to Step S502.

Step S502: The control section 11 sets, as a perforation determination region A2, a circular region with a radius that is a half of the distance from a center C to the circumference of the circular frame in the perforation candidate region A1 extracted at Step S501. Then, the routine proceeds to Step S503.

Step S503: The control section 11 determines whether or not the rate of pixels having an image density equal to that of the pixels in the reference image based on all the pixels in the perforation determination region A2 exceeds a predetermined threshold value. The threshold value is stored in the storage section 11b. The threshold value is 60% of the pixels in the perforation determination region A2, for example. When the rate of the pixels having the equal density does not exceed the threshold value, the routine proceeds to Step S505. By contrast, when the rate of the pixels having the equal density exceeds the threshold value, the routine proceeds to Step S504.

Step S504: When the rate of the pixels having an image density equal to that of the reference image based on all the pixels in the perforation determination region A2 exceeds the threshold value, the control section 11 determines that a perforation image is present in the perforation candidate region A1. Then, the image processing is ended.

Step S505: On the basis of the result that no circular frame is detected (NO at Step S501), or that the rate of the pixels having the equal image density does not exceed the threshold value (NO at Step S503), the control section 11 determines that no perforation image is present in the original image. Then, the image processing is ended.

With reference to FIGS. 1-7, description has been made about the image forming apparatus 100 including the image reading device 1 and the image processing method that the image reading device 1 performs according to the present embodiment. According to the image reading device 1 of the present embodiment, a perforation image in an original document image generated by reading an original document can be detected without need of any complicated detection mechanisms and any intricate detection steps.

Additional image processing such as determination of a blank document and/or deletion of a perforation image may be performed upon detection of a perforation image in the image reading device 1 of the present embodiment. Determination of a blank document is performed in a manner that upon determination that a perforation image is present in an original document image, the control section 11 eliminates the perforation candidate region A1 including the perforation image from a region to be subjected to blank document determination, and then determines whether or not the original document is a blank document. Upon determination that the original document is a blank document, the control section 11 deletes the original document image, for example. A perforation image is deleted in a manner that upon determination that a perforation image is present in an original document image, the control section 11 deletes the perforation image (e.g., circular frame).

It is noted that the control section 11 detects a circular frame from the left end part of an original document image in the above description, which however, should not be taken to limit the present disclosure. Detection of a circular frame in an entire original document image enables the control section 11 to detect a circular frame copied in a region other than the left end part (e.g., central part) of the original document image for determination of the presence of a perforation image.

The image reading device 1 in the embodiment described with reference to FIGS. 1-7 detects a perforation image in an original document image generated by reading one of the sides of the original document, which however, should not be taken to limit the present disclosure, as described with reference to FIG. 8.

Figure 8:
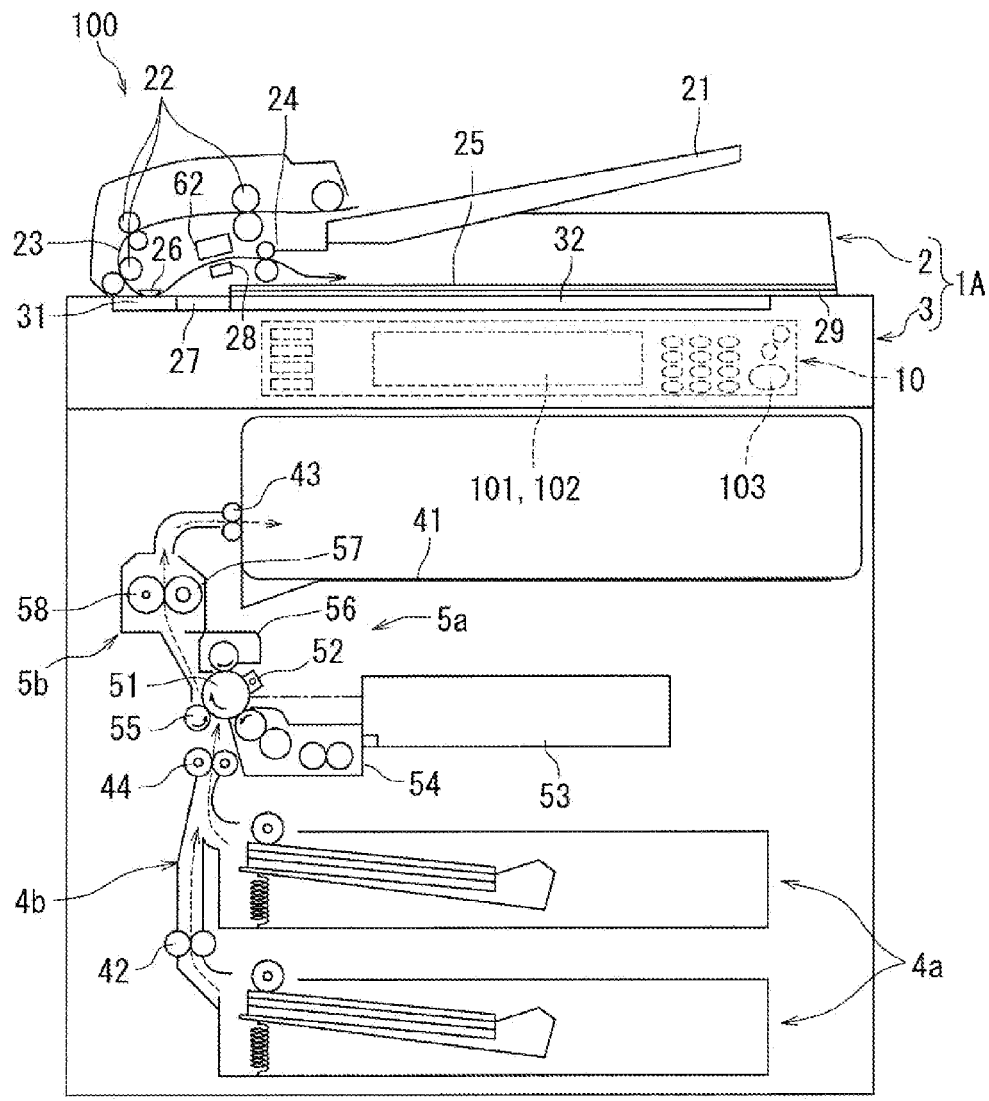
FIG. 8 is a schematic front cross sectional view of the image forming apparatus including an image reading device 1A according to another embodiment of the present disclosure.

FIG. 8 is a schematic front cross sectional view of an image forming apparatus 100 including an image reading device 1A according to another embodiment of the present disclosure. The image reading device 1A has the same configuration as that described with reference to FIG. 1 except further inclusion of a reading unit 62 (hereinafter also referred to as a second unit 62). Therefore, duplicate description thereof is omitted.

The second reading unit 62 is provided on the original document conveyance path 23. The second reading unit 62 is of CIS type. The second reading unit 62 is provided between the sending/reading contact glass 31 and the original document ejection roller pair 24, for example. The second reading unit 62 reads the reverse side of an original document subjected to duplex printing. Accordingly, one-time passing of such an original document through the original document conveyance path 23 can result in reading of both the opposite sides of the original document. Thus, both the opposite sides of the original document can be easily read without need of turning over the conveyance direction of an original document and provision of complicate original document conveyance path.

A white reference member 28 (hereinafter also referred to as a second white reference member) to indicate a white reference is provided to face the second reading unit 62. The second white reference member 28 is a guide plate extending in the main scanning direction of the image reading device 1A. The second white reference member 28 has an image density different from that of the first white reference member 27. It is noted that a roller may be provided as the second white reference member 28 rather than the guide plate.

[Image Processing that Image Reading Device 1A Performs]

Figure 9:
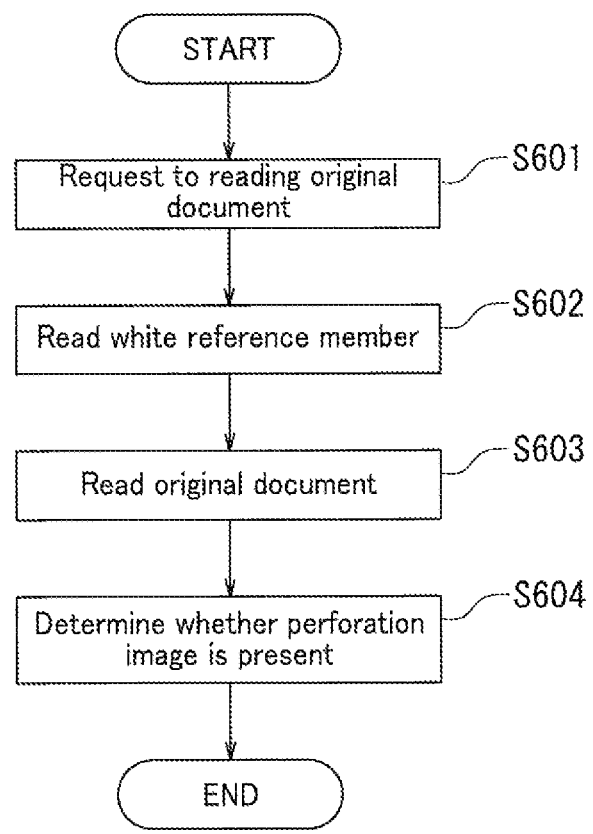
FIG. 9 is a flowchart depicting an image processing method that the image reading device 1A performs in copying or scanning.

FIG. 9 is a flowchart depicting an image processing method that the image reading device 1A performs. In the image processing method according to the present embodiment, the image reading device 1A performs perforation image detection on a first original document image generated by reading one side (hereinafter referred to as a first side) of an original document and on a second original document image generated by reading the opposite side (hereinafter referred to as a second side) thereof. The image processing method includes steps S601-S604. The image processing method according to the present embodiment will be described below with reference to FIGS. 8 and 9.

Step S601: The user pushes the start key 103 in the operating panel 10 to cause reading of an original document.

Step S602: In response to a request to read the original document, the first reading unit 61 (see FIG. 2) reads the first white reference member 27 to generate first reference image data. The first reference image data indicates an image of the first white reference member 27 (hereinafter referred to as a first reference image). On the other hand, the second reading unit 62 reads the second white reference member 28 to generate a second reference image data. The second reference image data indicates an image of the second white reference member 28 (hereinafter referred to as a second reference image). The first and second reference image data is stored in the storage section 11b.

Step S603: After Step S602, the reading units 61 and 62 read the original document. Specifically, the first reading unit 61 reads the first side of the original document conveyed by the document feeder 2 to generate first original document image data. The first original document data indicates an image of the first side of the original document (hereinafter referred to as a first original document image). The second reading unit 62 reads the second side of the original document conveyed by the document feeder 2 to generate second original document image data. The second original document data indicates an image of the second side of the original document (hereinafter referred to as a second original document image).

Step S604: After Step S603, the control section 11 determines whether or not a perforation image is present in the first original document image on the basis of the image density of the first reference image indicated in the first reference image data and the image density of the first original document image indicated in the first original document image data. The control section 11 also determines whether or not a perforation image is present in the second original document image on the basis of the image density of the second reference image indicated in the second reference image data and the image density of the second original document image indicated in the second original document image data.

Figure 10:
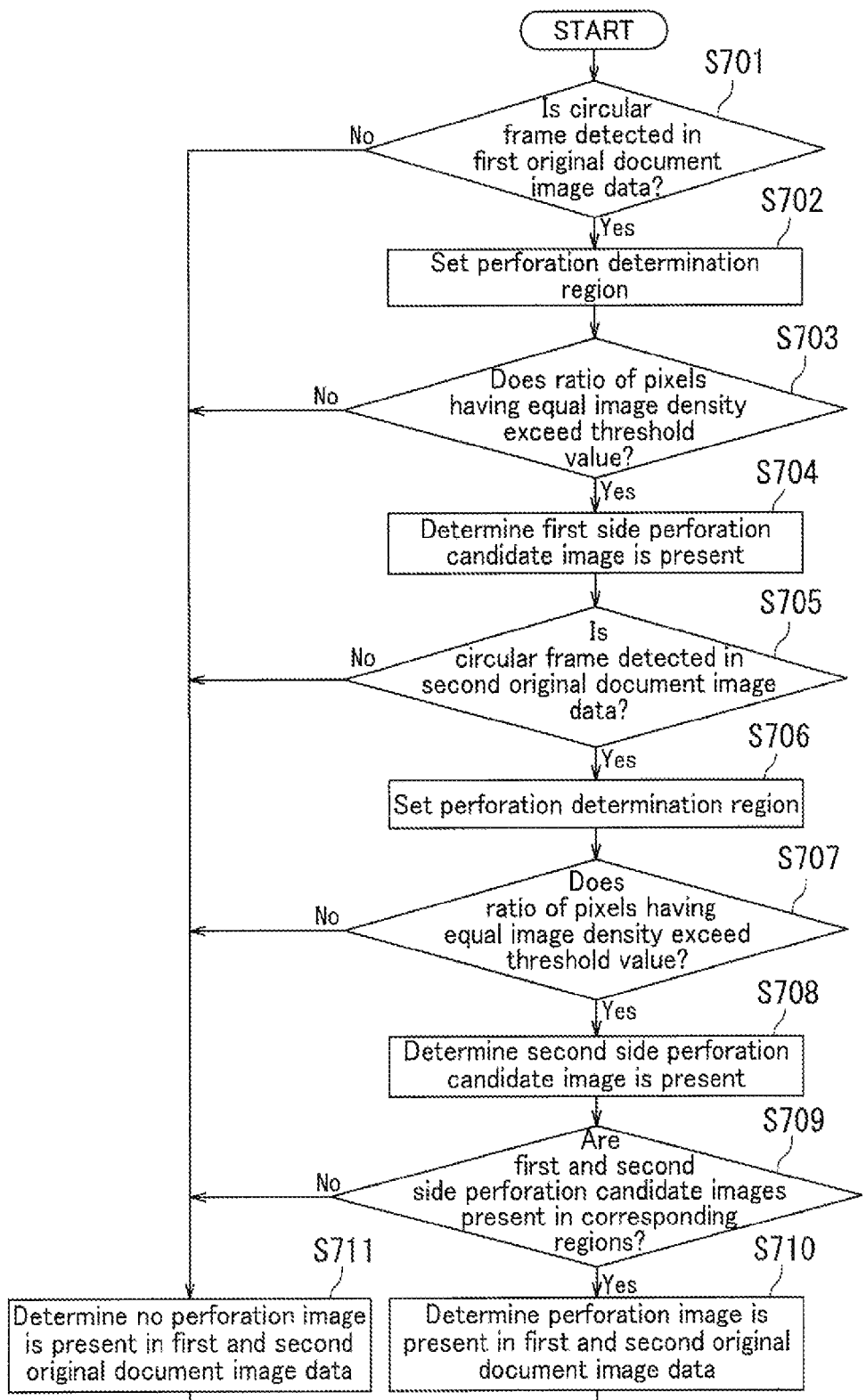
FIG. 10 is a flowchart depicting Step S604 in the image processing method according to one embodiment.

FIG. 10 is a flowchart depicting Step S604 in the image processing method according to the present embodiment. Step S604 is performed through Steps S701-S711.

Step S701: The control section 11 analyses the first original document image to detect a circular frame in the first original document image. When no circular frame is detected, the routine for the image processing proceeds to Step S711. By contrast, when a circular frame is detected, the control section 11 extracts a region including the circular frame as a perforation candidate region A1 (see FIG. 7). Then, the routine proceeds to Step S702.

Step S702: The control section 11 sets, as a perforation determination region A2 (see FIG. 7), a circular region with a radius that is a half of the distance from the center C to the circumference of the circular frame in the perforation candidate regions A1 extracted at Step S701. Then, the routine proceeds to Step S703.

Step S703: The control section 11 determines whether or not the rate of pixels having an image density equal to that of the pixels in the first reference image based on all the pixels in the perforation determination region A2 exceeds a predetermined threshold value. When the rate of the pixels having an image density equal to that of the first reference image does not exceed the threshold value, the routine proceeds to Step S711. By contrast, when the rate of the pixels having an image density equal to that of the pixels in the first reference image exceeds the threshold value, the routine proceeds to Step S704.

Step S704: When the rate of the pixels having an image density equal to that of the pixels in the first reference image based on all the pixels in the perforation determination region A2 exceeds the threshold value, the control section 11 determines that a first side perforation candidate image is present in the perforation candidate region A1 of the first original document image. Then, the routine proceeds to Step S705.

Step S705: The control section 11 analyses the second original document image to detect a circular frame in the second original document image. When no circular frame is detected, the routine for the image processing proceeds to Step S711. By contrast, when a circular frame is detected, the control section 11 extracts a region including the circular frame as a perforation candidate region A1. Then, the routine proceeds to Step S706.

Step S706: The control section 11 sets, as a perforation determination region A2, a circular region with a radius that is a half of the distance from the center C to the circumference of the circular frame in the perforation candidate region A1 extracted at Step S705. Then, the routine proceeds to Step S707.

Step S707: The control section 11 determines whether or not the rate of pixels having an image density equal to that of the pixels in the second reference image based on all the pixels in the perforation determination region A2 exceeds a predetermined threshold value. When the rate of the pixels having an image density equal to that of the pixels in the second reference image does not exceed the threshold value, the routine proceeds to Step S711. By contrast, when the rate of the pixels having an image density equal to that of the pixels in the second reference image exceeds the threshold value, the routine proceeds to Step S708.

Step S708: When the rate of the pixels having an image density equal to that of the pixels in the second reference image based on all the pixels in the perforation determination region A2 exceeds the threshold value, the control section 11 determines that a second side perforation candidate image is present in the perforation candidate region A1 in the second original document image. Then, the routine proceeds to Step S709.

Step S709: The control section 11 determines whether or not the first and second perforation candidate images are present in regions corresponding to each other in the first and second original document images, respectively. In one example, the control section 11 calculates the coordinate geometry of the first side perforation candidate image in the first original document image and determines whether or not the second side perforation candidate image is present in the same coordinate geometry of the second original document region image. Alternatively, the control section 11 may calculate the coordinate geometry of the second side perforation candidate image in the second original document image and determines whether or not the first side perforation candidate image is present in the same coordinate geometry of the first original document region image. When it is determined that the first and second perforation candidate images are present in the respective regions corresponding to each other, the routine proceeds to Step S710. By contrast, when it is determined that neither the first nor second perforation candidate images is present in the respective regions corresponding to each other, the routine proceeds to Step S711.

Step S710: When it is determined that the first and second perforation candidate images are present in the respective regions corresponding to each other at Step S709, the control section 11 determines that a perforation image is present in each of the first and second original document images. Then, the image processing is ended.

Step S711: Upon detection of no circular frame in the first original document image (NO at Step S701), or detection of no circular image in the second original document image (NO at Step S705), the control section 11 determines that no perforation image is present in the first and second original document images. Then, the image processing is ended. The control section 11 also determines that no perforation image is present in the first and second original document images on the basis of the result that the rate of the pixels having the equal image density does not exceed the threshold value (NO at Step S703 or S707). Then, the image processing is ended. Or, the control section determines that no perforation image is present in the first and second original documents on the basis of the result of determination that neither the first perforation candidate image nor the second perforation candidate image is present in the regions corresponding to each other in the opposite sides of the original document (NO at S709). Then, the image processing is ended.

Description has been made about the image forming apparatus 100 including the image reading device 1A and the image processing method that the image reading device 1A performs according to one embodiment with reference to FIGS. 8-10. Where determination as to whether or not a perforation image is present is performed on an original document image generated by reading one side of an original document of which blank region has an image density rather close to the image density of the white reference member, a perforation image may not be discriminated against the image of the blank region in the original document image. In view of this, the image density of the first reference member 27 is differentiated from that of the second reference member 28 in the image reading device 1A according to the present embodiment. In general, blank regions on the respective opposite sides of an original document have an equal image density. Therefore, even when the image density of the blank region on one of the sides is equal to that of one of the white reference members (e.g., the first white reference member 27), the image density of the blank region on the other side is different from that of the other white reference member (e.g., the second white reference member 28). Accordingly, when the first and second perforation images are present in the respectively corresponding regions of the first and second original document images generated by reading the respective sides of an original document, the presence of the perforation image is determined in the image reading device 1A of the present embodiment. Thus, a perforation image can be detected accurately. Upon detection of a perforation image, the image reading device 1A may also perform additional image processing such as determination of a blank document and/or deletion of a perforation image.

The image density of the first white reference member 27 is different from that of the second white reference member 28 in the embodiment described with reference to FIGS. 8-10, which however, should not be taken to limit the present disclosure. The image density of the first white reference member 27 may be equal to that of the second white reference member 28. In this case, a perforation image can be detected in the first and second original document images generated by reading the respective sides of an original document including blank regions on the respective sides having an image density different from that of the first and second white reference members 27 and 28.

The first reading unit 61 is of CIS type in each of the above embodiments. However, the present disclosure is not limited to this. The first reading unit 61 may be of CCD type including an optical system with a lamp and a mirror.

Further, the reference image data is obtained by reading the white reference member each time a request to read an original document is received, which however, should not be taken to limit the present disclosure. The reference image data indicative of the white reference member may be stored in the storage section 11b in advance so that a perforation image is detected by comparing original document image data generated by reading an original document with the reference image data stored in the storage section 11b.

In addition, the reference image data is obtained by reading the white reference member 27 in the above embodiment. Alternatively, the guide member 26 or the original cover 29 may be used as a white reference member in a manner to obtain the reference image data by reading the guide member 26 or the original cover 29 before an original document is read. In a region where a perforation P is formed, the light from the reading unit 61 passes through the perforation P to irradiate the guide member 26 or the original cover 29, so that the reading unit 61 reads the reflected light from the guide member 26 or the original cover 29. Accordingly, when the reference image data is obtained by reading the guide member 26 or the original cover 29, appropriate detection of a perforation can be performed.

It is noted that the control section 11 sets, as the perforation determination region A2, a circular region with a radius that is a half of the distance from the center C to the circumference of the circular frame in the perforation candidate region A1 in the above embodiment. However, the control section 11 may set, as the perforation determination region A2, a circular region with a radius that is 1/n of the distance from the center C to the circumference of the circular flame, where n is larger than 1. In one example, the distance from the center C to the circumference of a circular frame may be ⅓.

What is claimed is:

1. An image reading device comprising:
an image reading section configured to read an original document;
a first white reference member configured to be read by the image reading section and to indicate a first white reference;
a control section configured to determine whether or not a perforation image is present in the original document image indicative of the original document on a basis of an image density of a first reference image indicative of the first white reference member and an image density of the original document image; and
a second white reference member configured to be read by the image reading section and to indicate a second white reference,
wherein the original document has a first side and a second side opposite to the first side,
the image reading section includes:
  a first reading unit configured to read the first white reference member and the first side of the original document; and
  a second reading unit configured to read the second white reference member and the second side of the original document,
the control section determines whether or not a first side perforation candidate image is present in a first original document image indicative of the first side of the original document on a basis of the image density of the first reference image and an image density of the first original document image, while determining whether or not a second perforation candidate image is present in a second original document image indicative of the second side of the original document on a basis of the image density of a second reference image indicative of the second side of the original document and an image density of the second original document image, and the control section determines whether or not the perforation image is present in the first and second original document images on a basis of a result of determination as to whether or not the first and second side perforation candidates are present in the respective regions corresponding to each other in the first and second original document images.

2. The image reading device according to claim 1, wherein the image density of the first white reference member is different from that of the second white reference member.

3. The image reading device according to claim 1, wherein the control section eliminates a region including the perforation image and determines whether or not the original document is a blank document on a basis of a result of determination.

4. The image reading device according to claim 1, wherein the control section deletes the perforation image on a basis of a result of determination.

5. An image forming apparatus, comprising:
the image reading device according to claim 1; and
an image forming section configured to form a toner image on a sheet.

6. An image reading device comprising:
an image reading section configured to read an original document;
a first white reference member configured to be read by the image reading section and to indicate a first white reference; and
a control section configured to determine whether or not a perforation image is present in the original document image indicative of the original document on a basis of an image density of a first reference image indicative of the first white reference member and an image density of the original document image, wherein the control section extracts a perforation candidate region including a circular frame from the original document image, the control section determines whether or not the perforation image is present in the original document image on a basis of the image density of the first reference image and an image density of the perforation candidate region of the original document image, the control section sets a circular region with a radius that is 1/n of a distance from a center to a circumference of the circular frame in the perforation candidate region as a perforation determination region, wherein n is larger than 1, and the control section determines whether or not the perforation image is present in the original document image on a basis of the image density of the first reference image and an image density of the perforation determination region in the original document image.

7. The image reading device according to claim 6, wherein n is 2.

8. The image reading device according to claim 6, further comprising:
a storage section configured to store a threshold value set in advance,
wherein the control section determines whether or not the perforation image is present in the original document image in a manner to determine whether or not a rate of pixels having an image density equal to the image density of the first reference image based on all pixels of the perforation determination region exceeds the threshold value.

9. The image reading device according to claim 6, wherein the control section eliminates a region including the perforation image and determines whether or not the original document is a blank document on a basis of a result of determination.

10. The image reading device according to claim 6, wherein
the control section deletes the perforation image on a basis of a result of determination.

11. An image forming apparatus, comprising:
the image reading device according to claim 6; and
an image forming section configured to form a toner image on a sheet.

* * * * *